US007905599B2

(12) United States Patent
Huang et al.

(10) Patent No.: US 7,905,599 B2
(45) Date of Patent: Mar. 15, 2011

(54) METHODS FOR DIAGNOSING GLAUCOMA UTILIZING COMBINATIONS OF FD-OCT MEASUREMENTS FROM THREE ANATOMICAL REGIONS OF THE EYE

(75) Inventors: David Huang, South Pasadena, CA (US); Ake Lu, Los Angeles, CA (US); Ou Tan, Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 12/771,849

(22) Filed: Apr. 30, 2010

(65) Prior Publication Data

US 2010/0277691 A1 Nov. 4, 2010

Related U.S. Application Data

(60) Provisional application No. 61/174,463, filed on Apr. 30, 2009.

(51) Int. Cl.
*A61B 3/00* (2006.01)

(52) U.S. Cl. ............................ 351/246; 351/205
(58) Field of Classification Search ............. 351/246, 351/205, 206, 221, 207, 203; 600/476
See application file for complete search history.

(56) References Cited

U.S. PATENT DOCUMENTS 6,293,674 B1 * 9/2001 Huang et al. ............... 351/221
7,798,647 B2 * 9/2010 Meyer et al. ............... 351/246

* cited by examiner

*Primary Examiner* — Hung X Dang
(74) *Attorney, Agent, or Firm* — DLA Piper LLP (US)

(57) ABSTRACT

This invention discloses methods and systems for diagnosing glaucoma by combining diagnostic parameters derived from optical coherence tomography images of three different anatomic regions of the eye, including the macular ganglion cell complex (mGCC), the peripapillary nerve fiber layer (pp-NFL), and the optic nerve head (ONH). The combined diagnostic parameters form a reduced set of global parameters, which are then fed to pre-trained machine classifiers as input to arrive at a single diagnostic indicator for glaucoma. Also disclosed are methods for training a machine classifier to be used in methods and systems of this invention.

21 Claims, 9 Drawing Sheets

METHODS FOR DIAGNOSING GLAUCOMA UTILIZING COMBINATIONS OF FD-OCT MEASUREMENTS FROM THREE ANATOMICAL REGIONS OF THE EYE

CROSS-REFERENCE TO RELATED APPLICATIONS

This application claims the benefit of U.S. Provisional Application No. 61/174,463, file on Apr. 30, 2009. The above application(s) is hereby incorporated herein by reference.

STATEMENT REGARDING FEDERALLY SPONSORED RESEARCH OR DEVELOPMENT

This invention was made with government support under Contract No. RO1 EY013516 awarded by the National Institute of Health. The government has certain rights in the invention.

FIELD OF THE INVENTION

The present invention relates in general to glaucoma diagnosis. More specifically, the invention relates to methods and systems for combining diagnostic information derived from two or three anatomic regions of the eye to arrive at a single diagnostic indicator for glaucoma. The key combinations of anatomic regions are the macular ganglion cell complex, the peripapillary nerve fiber layer, and the optic nerve head; or the macular ganglion cell complex and the peripapillary nerve fiber layer.

BACKGROUND OF THE INVENTION

Glaucoma is the second leading cause of blindness in the U.S. It is characterized by loss of retinal ganglion cells, thinning of the retinal nerve fiber layer, or cupping of the optic disc. Conventional tests are based on measurements of intraocular pressure and visual field tests. Because there may be significant structural loss before functional loss begin to manifest, these tests often miss early stages of the disease. In theory, diagnosis based on structural loss should be able to detect glaucoma at a stage earlier than detectable visual field defects. Structural damages associated with glaucoma are characteristically distributed in the above mentioned three anatomic regions, thus, diagnostic tools capable of providing information on structural changes on these anatomic regions are potentially useful for glaucoma diagnosis.

Figure 1:
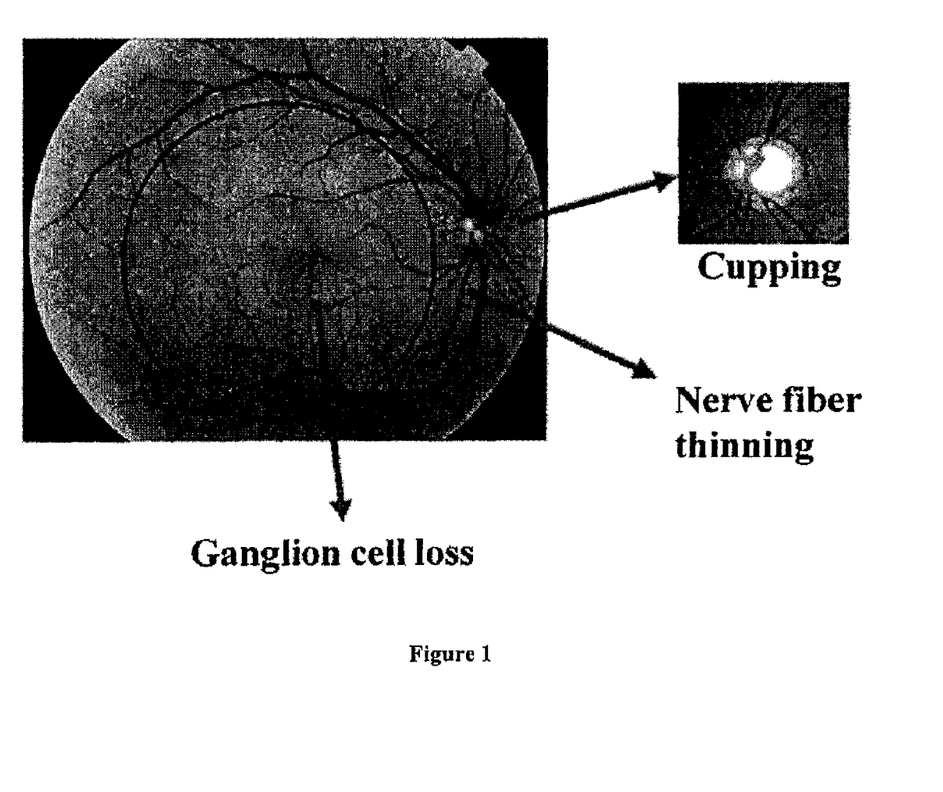
FIG. 1 is an FD-OCT image showing loss of retinal ganglion cells, thinning of the retinal nerve fiber layer, and cupping of the optic disc.

To this end, there are currently a number of diagnostic methods and tools capable of providing direct and indirect information on different anatomic regions of the eye. In particular, the recent introduction of Fourier-domain optical coherence tomography (FD-OCT) enables high density retinal mapping over a large area in a short period of time. The short image acquisition time reduces motion error, and the high image density and large image area permits more detailed pattern analysis. FIG. 1 shows an example of a FD-OCT image depicting the structural loss due to glaucoma in the posterior segment of the eye.

Ironically, these technological advances have created an informational crisis. Given the variety of methods and instrumentations providing a bewilderment of diagnostic information, how to interpret and combine these diverse sources of information to arrive at a meaningful clinical diagnosis has become a major challenge. Moreover, while imaging technologies are now available to provide detailed images of the eye, qualitative interpretation of these images by trained experts can vary widely. Thus, the information has not led to better or easier clinical decision making.

Therefore, there exists an urgent need for automated, quantitative methods of analyzing imaging data to arrive at reliable and reproducible diagnosis of glaucoma.

SUMMARY OF THE INVENTION

In view of the above, it is an object of this invention to provide a method for quantitatively and automatically analyzing imaging data obtained from optical coherence tomography (OCT), particularly FD-OCT.

It is also an object of this invention to provide a general method for combining diagnostic information from the three anatomic regions affected by glaucoma to arrive at a diagnosis.

It is yet another object of this invention to provide a diagnostic system for automatically diagnosing a patient's glaucoma status.

These and other objects of the invention are accomplished by the methods and systems described herein.

While not intending to be bound by any particular theory, this invention was inspired by the inventors' observation that the damages associated with glaucoma generally include thinning of the inner retinal layers in the macula region and the nerve fiber layer around the optic disc, as well as enlarged cup and reduced rim in the optic nerve head. The inventors observed that glaucoma cases follow 3 different patterns where the damage to the eye is either superior-dominant, inferior-dominant, or evenly distributed between the superior and inferior hemispheres. Based on these observations, the inventors of this invention hypothesized that in each individual eye, the same pattern of damages may apply to the optic nerve head (ONH), the peripapillary nerve fiber layer (ppNFL), and most likely the macular ganglion cell complex (mGCC) as well. Accordingly, the inventors have devised a novel approach of combining diagnostic parameters from the three anatomic regions by taking into account the correlated patterns of damages in the three regions. The inventors further incorporated machine learning technologies to create automated methods and systems of this invention.

In one aspect, the present invention provides a machine classifier based method of diagnosing glaucoma in a subject. Methods in accordance with this aspect of the invention generally include the steps of obtaining OCT images from each of the three anatomic regions of the patient's eye; processing the images to obtain a predetermined collection of diagnostic parameters; transforming the collection of diagnostic parameters to arrived at a reduced set of global diagnostic parameters; and then applying a pre-trained machine classifier to the reduced set of global diagnostic parameters to arrive at a single diagnostic indicator. The predetermined collection of diagnostic parameters will have three basic characteristics. First, each diagnostic parameter in the collection is derived from OCT images of one of the three anatomic regions. Second, in cases where the diagnostic parameter is a glaucoma pattern cross-correlation (GPCC) parameter, it is further classified as being one of the following three GPCC types: superior, inferior, or even. Third, at least mGCC and ppNFL, and all three GPCC types within each region must be represented in the collection.

In still a further aspect, the present invention provides a method of training a machine classifier for glaucoma diagnosis. Methods in accordance with this aspect of the invention generally include the steps of providing a training dataset consisting of an initial set of diagnostic parameters obtained from a sample population of subjects; selecting a trial set diagnostic parameters from the dataset; transforming the trial set of diagnostic parameters to arrive at a reduced set of global diagnostic parameters, training the machine classifier using with the reduced global diagnostic parameters; and optimizing the machine classifier using area under the receiving operator characteristic curve (AROC) as a guide. The sample of population consists of a first population of healthy subjects and a second population of subjects suffering from perimetric glaucoma (glaucoma diagnosis confirmed by perimetry, also called visual field). The initial set of diagnostic parameters will have, the following two characteristics: First, each diagnostic parameter is derived from OCT images of an anatomic region of a subject's eye selected from the group consisting of mGCC, ppNFL, and ONH. Second, in cases where the diagnostic parameter is a glaucoma pattern cross-correlation parameter, it is further classified as being one of three GPCC types selected from superior, even, and inferior. The trial set of diagnostic parameters are selected such that at least mGCC and ppNFL and all three GPCC types for each region are represented. The process may be repeated with selection of different trial set of diagnostic parameters so that an optimal set of diagnostic parameters may be determined.

In yet another aspect, the present invention provides a system for diagnosing glaucoma in a patient. Systems in accordance with this aspect of the invention generally include a computing unit configured for receiving a predetermined collection of diagnostic parameters, transforming the collection of diagnostic parameters according to a predetermined formula to arrive at a reduced set of global parameters, and applying a pre-trained machine classifier to the reduced global parameters to arrive at a single indicator; and an input/output unit operatively connected to the computing unit for receiving input from an end user and outputting the indicator to the end user. The predetermined collection of diagnostic parameters has the following three characteristics: First, each diagnostic parameter is derived from OCT images of an anatomic region of the patient's eye selected from the group consisting of mGCC, ppNFL, and ONH. Second, in cases where the parameter is a glaucoma pattern cross-correlation parameter, it is further classified as one of three GPCC types consisting of superior, inferior, and even. Third, at least mGCC and ppNFL regions, and all GPCC types of each region are represented in the collection of diagnostic parameters.

The computing unit may be the same computing unit operating the OCT device, a PC, or any other suitable computers known in the art. Methods for configuring the computing unit generally involve loading a software program implementing methods of this invention. Given the detailed description of methods disclosed herein, those skilled in the art will be able to write computer programs implementing the methods. Exemplary programming tools may include C/C++, Matlab, FORTRAN, or any other programming language commonly known in the art. The computing unit may be any suitable computing unit, including standalone PCs, mainframe servers, or a integrated computing unit on the OCT device, but are not limited thereto.

In the above methods and systems, any OCT device capable of high speed, high density scanning may be used, but FD-OCT is preferred.

The diagnostic parameters may be any commonly used or future defined diagnostic parameters based on OCT scans of a single anatomic region. Exemplary diagnostic parameters for the mGCC region may include superior GPCC, superior hemispheric average, even GPCC, global average, inferior GPCC, inferior hemispheric average, focal loss volume, global loss volume and pattern coefficient variation. Exemplary diagnostic parameters for the ppNFL region may include superior GPCC, superior hemispheric average, superior quadrant average, even GPCC, global average, inferior GPCC, inferior hemispheric average, inferior quadrant average focal loss volume, global loss volume and pattern coefficient variation. Exemplary diagnostic parameters for the ONH region may include rim area or volume parameters (superior GPCC, superior hemispheric average, superior quadrant average, even GPCC, global average, inferior GPCC, inferior hemispheric average, inferior quadrant average focal loss volume, global loss volume) and cup parameters (vertical cup/disc ratio, horizontal cup/disc ratio, cup/disc area ratio, and cup/disc volume ratio).

The mathematics for transforming or combining the parameters are not particularly limited, so long as parameters from all three anatomic regions contribute to the resulting transformed global parameter. Exemplary mathematics for transforming the diagnostic parameters may include addition, subtraction, multiplication, or any other suitable mathematical functions known in the art.

The machine classifier is also not particularly limited. Any machine classifier commonly known in the art may be suitably used. Exemplary machine classifier may include linear discriminant function (LDF), logistic regression model, support vector machine (SVM) and relevance vector machine (RVM), but are not limited thereto. Preferably, SVM and RVM classifiers with Gaussian kernels are used.

Methods and systems of this invention will have at least the advantages of being easy to administer and operate. Because OCT system are currently available in many clinics, methods and systems of this invention can be easily deployed as a software upgrade. The diagnostic indicator of the present invention, which incorporate information on the pattern of glaucomatous damage in 3 separate anatomic regions, has higher glaucoma diagnostic sensitivity and specificity than parameters derived from any single diagnostic region. Reducing the myriad of diagnostic information into a single diagnostic indicator makes it easier for the clinician to decide the level of treatment (medications, laser, or surgery) and the frequency of followup visits that are needed for the eye being tested.

Other aspects and advantages of the invention will be apparent from the following description and the appended claims.

BRIEF DESCRIPTION OF THE DRAWINGS

FIG. 2 (A) shows a mGCC scan pattern consisting of 16 lines raster scan over 7×7 mm macula. (B) shows macula ganglion cell complex map based on a mGCC scan.

FIG. 3 (A) shows ONH, combined radial scans and circle scans covering a 5 mm diameter region. (B) shows a ppNFL thickness map and cup/disc segmentation based on an ONH scan. (C) shows cup/disc/rim based on an ONH scan.

FIG. 5 shows exemplary deviation maps of mGCC and ppFNL from an eye with an inferior pattern of glaucoma. (A) Thickness map, deviation map and fraction deviation map (B) Pattern deviation map and focal loss mask

DETAILED DESCRIPTION

The present invention will now be described in detail by referring to specific embodiments as illustrated in the accompanying figures.

DEFINITIONS

As used herein, the term mGCC refers to the macular area of the ganglion cell complex, which consists of the nerve fiber layer (NFL), ganglion cell layer (GCL) and the inner plexiform layer (IPL) of the retina.

As used herein, the term ppNFL refers to peripapillary Nerve Fiber Layer.

As used herein, the term ONH refers to the optic nerve head.

As used herein, the term MLM refers to machine learning methods, or machine classifiers. A machine classifier is a statistical procedure in which individual items are placed into groups based on quantitative information on one or more characteristics inherent in the items (referred to as traits, variables, characters, etc) and based on a training set of previously labeled items.

As used herein, the term GPCC refers to glaucoma pattern cross-correlation. The formula for computing a pattern cross-correlation is discussed in detail below.

Overview

Many diagnostic parameters with high diagnostic power for glaucoma are available from images and maps of different anatomic regions. However, as mentioned above, practicing ophthalmologists do not know how to combine the information from the parameters within the same anatomic or across different anatomic regions to arrive at a meaningful diagnosis for glaucoma. This state of affair may partially be explained by the fact that the exact underlying cause of glaucoma is still not well understood, thus, the relationships between the different physiologic presentations measured by the different diagnostic parameters are not easily discoverable. Without knowing the relationships between the different diagnostic parameters, it is difficult to fathom any combinations of the parameters that may yield a better performing diagnostic indicator than the uncombined parameters alone.

The present invention describes methods that overcome the aforementioned difficulty. In particular, this invention provides a method for combining parameters within and across anatomic regions.

Figure 2:
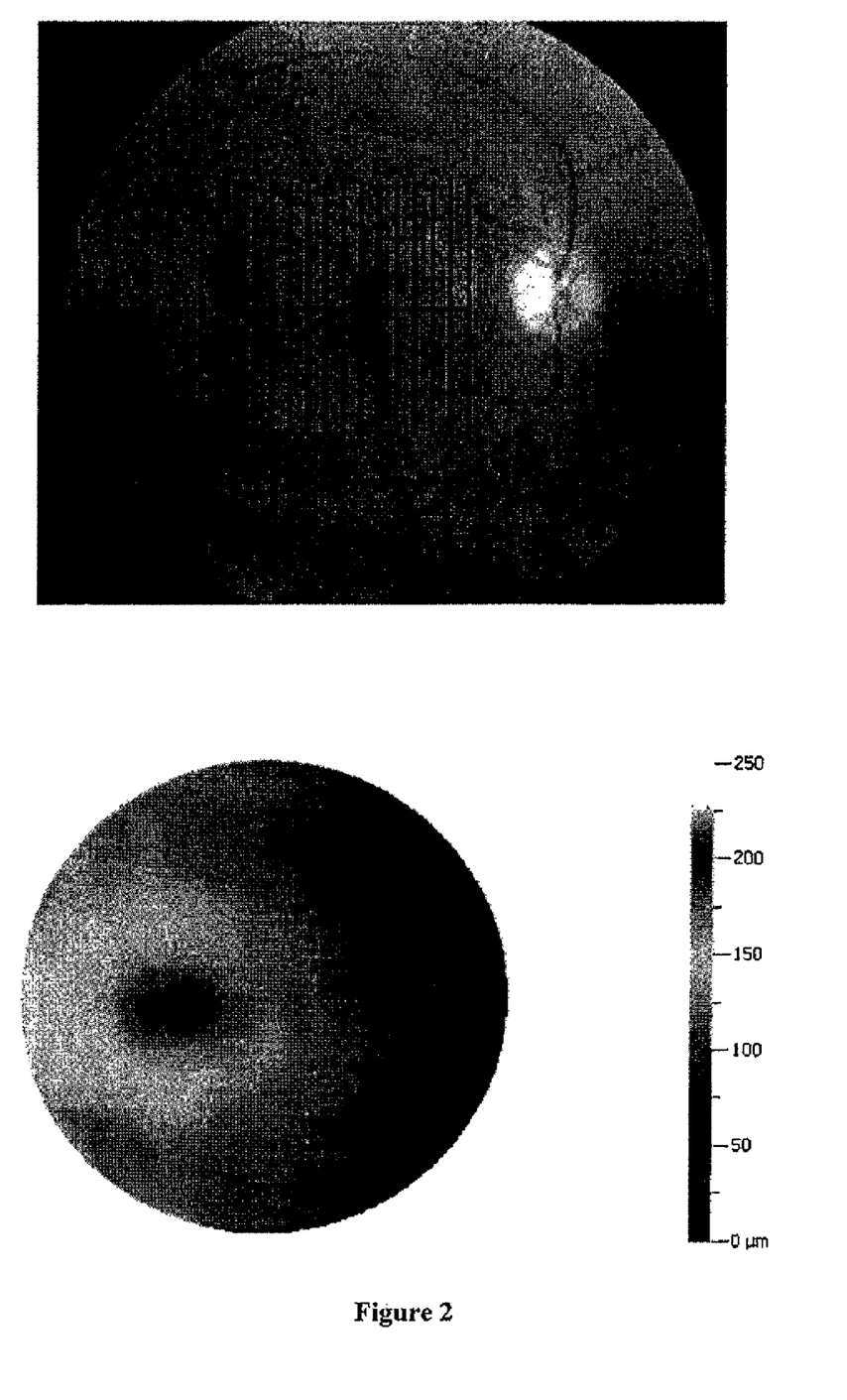
Figure 3A:
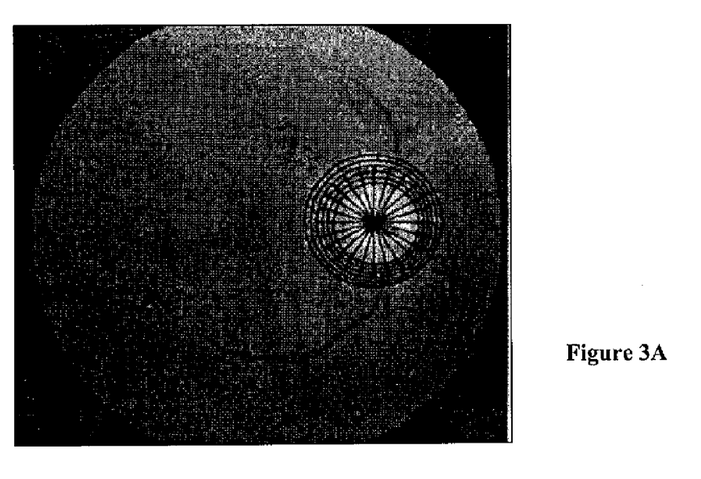
Figure 3B:
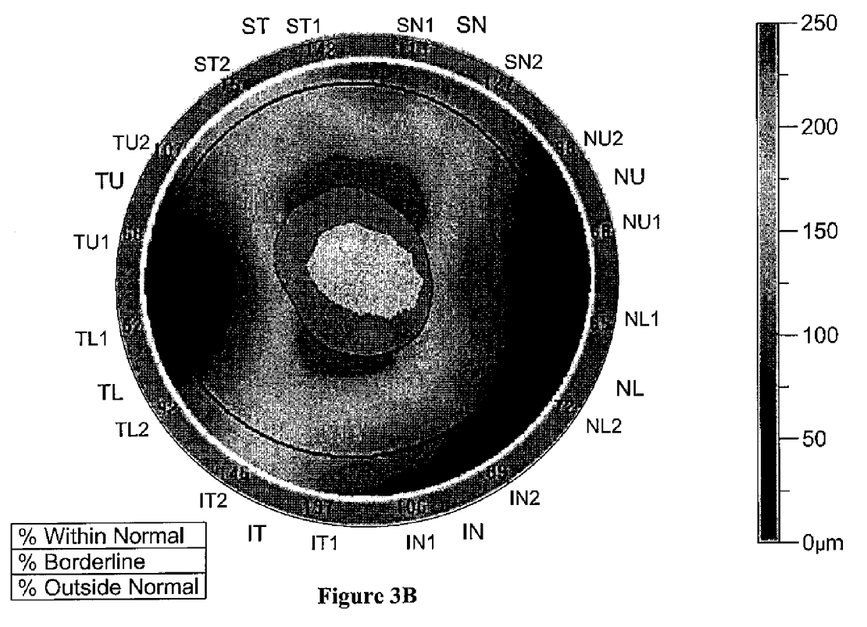
Figure 3C:
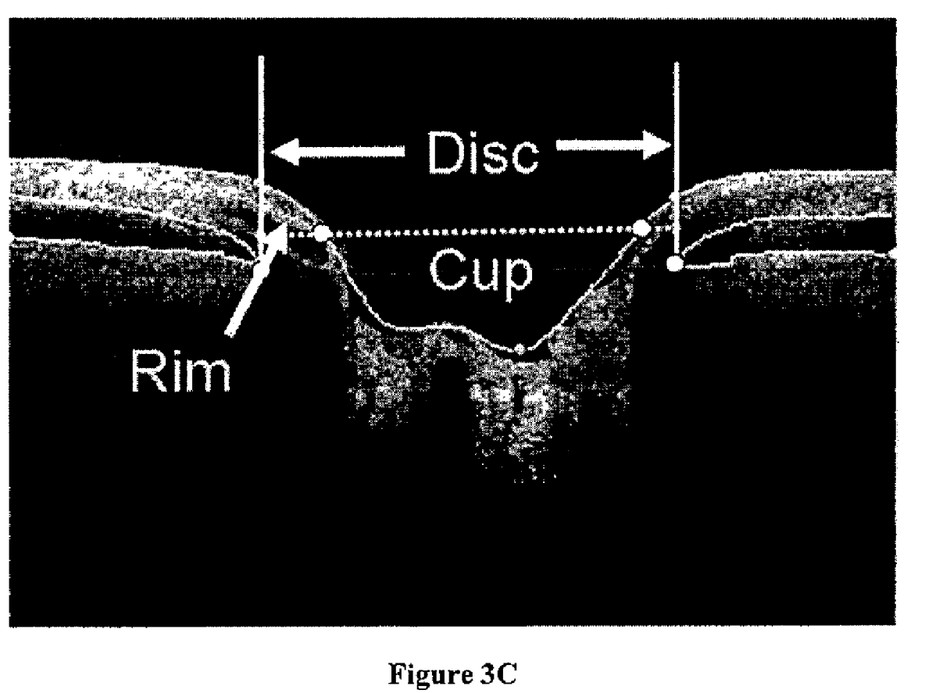

For the three regions affected by glaucoma, OCT provides corresponding diagnostic parameters in each region. For example, in RTVue FD-OCT (available from Optovue, Inc., Fremont, Calif., USA), the parameters are generated through two scan patterns. The mGCC thickness map is constructed by mGCC scan (FIG. 2). The ppNFL thickness map and optic disc shape are constructed by ONH scan (FIG. 3). Combining the parameters from multiple regions to yield a single indicator will provide ophthalmologists a direct interpretation for glaucoma diagnosis.

As a proof of concept, a total of 157 eyes from 50 normal (N) and 50 age-matched perimetric glaucoma (PG) participants in the Advanced Imaging for Glaucoma Study (AIGS, www.AIGStudy.net) were evaluated according to methods of the invention. The age of participants ranges from 41 to 75 years old.

Figure 4:
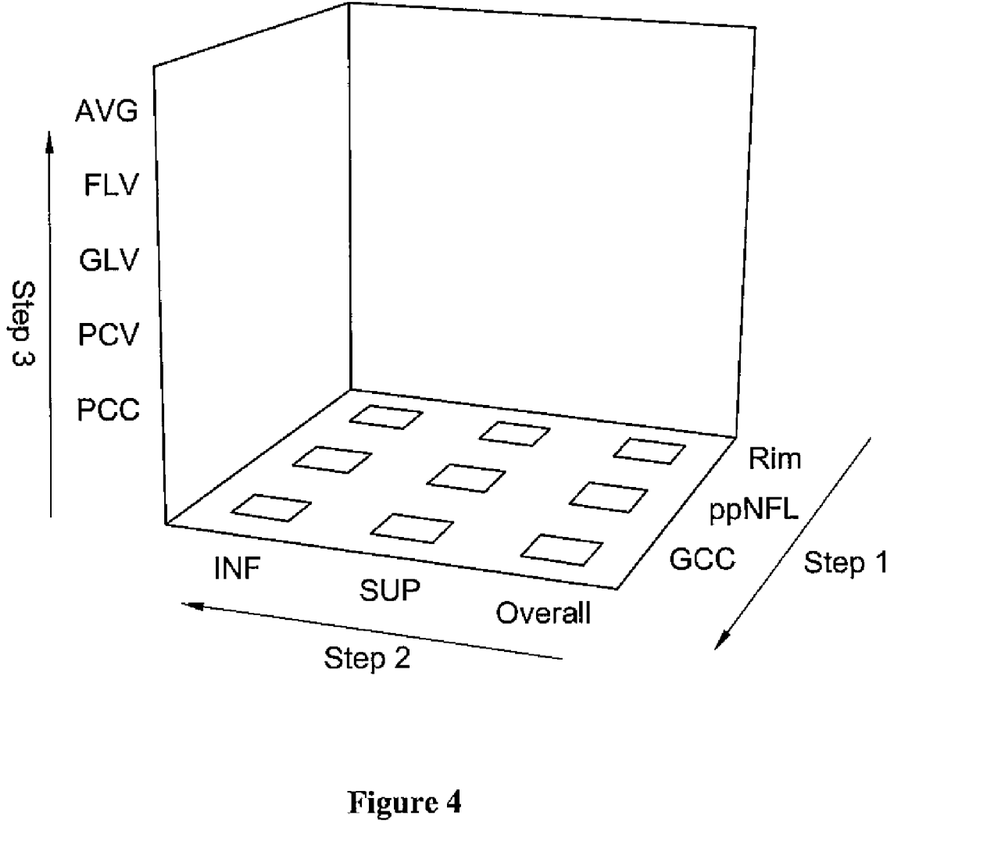
FIG. 4 shows schematic representations of an exemplary strategies of combining diagnostic parameters. Step 1: combine parameters for three anatomic regions; Step 2: combine inferior, superior and overall information; Step 3: combine different parameters.

For glaucoma, loss of the mGCC in the superior macula corresponds to superior ppNFL damage and superior rim loss. Loss in the inferior hemisphere works in similar ways. Thus, in Step 1, parameters across mGCC, ppNFL and the rim region may be combined first. Then, in Step 2, superior, inferior and overall parameter may be combined (FIG. 4). In an alternate strategy, the order of combination may be reversed, i.e., superior, inferior and overall parameter may be combined first for each anatomy region followed by combining the parameters across the 3 anatomic regions. In this way, steps 1 and 2 will result in a set of reduced global parameters. Finally, in Step 3, a machine classifier is applied to the reduced global parameters to arrive at a single indicator for glaucoma.

Machine Classifiers

Several machine classifiers such as linear discriminant function (LDF) (1), logistic regression model (2), support vector machine (SVM) (3) and relevance vector machine (RVM) (4) have been applied in eye studies for combining diagnostic parameters in discriminating N and PG eyes (5-9). In the LDF approach, diagnostic parameters are combined through a linear combination equation with different weight coefficients summed into one number. The weights are computed so that the LDF is optimized for discriminating two classes (N and PG in this invention). A logistic regression model assumes a logit link between probability of being in one class (PG in this invention) and diagnostic parameters. The model generates a linear equation between the logit (P), $\log(p/1-p)$, and the diagnostic parameters with different coefficients, where the p denote the probability of glaucoma and the coefficients are estimated in optimizing the log-likelihood of the underlying model. The SVM approach searches a hyperplane that optimizes the margin between classes (N and PG in this invention) in classification analysis. The relationship between classes can be linear, or nonlinear through a kernel function (Gaussian, polynomial, wavelet, and so on).

Briefly, in SVM, the machine classifier is first subjected to a training process, and then followed by a testing process. In the training process, SVM uses the training dataset to find supporting vectors that optimize the separation between N and PG groups. In the testing process, those supporting vectors are applied to the testing dataset and generate composite scores for each observation in the test dataset.

The RVM approach is basically an extension of SVM. It generalizes the support vector methodology with a Bayesian approach adopted during optimizing the margin between classes and searches relevance vectors in the training process. The RVM generated composite scores can be further transformed into a zero to one probability score. In some embodiments of the invention, this is the probability for glaucoma.

The scores could provide ophthalmologists a more intuitive interpretation for glaucoma diagnosis. In the exemplary embodiments described herein, the inventors demonstrated two machine learning methods—SVM and RVM—to combine diagnostic parameters in Step 3. These two machine classifiers are preferred because both classifiers allow more flexibility for the relationship between N and PG groups than the other classifiers.

Diagnostic Parameters

The inventors have previous developed methods of analyzing the pattern of mGCC thickness loss and defined the diagnostics parameters focal loss volume (FLV), global loss volume (GLV), pattern coefficient variation (PCV) from mGCC map. Details of these diagnostic parameters have been submitted for publication (10) and is the subject of the inventors' copending application Ser. No. 12/139,375, the entire content of which are incorporated herein by reference.

Figure 5A:
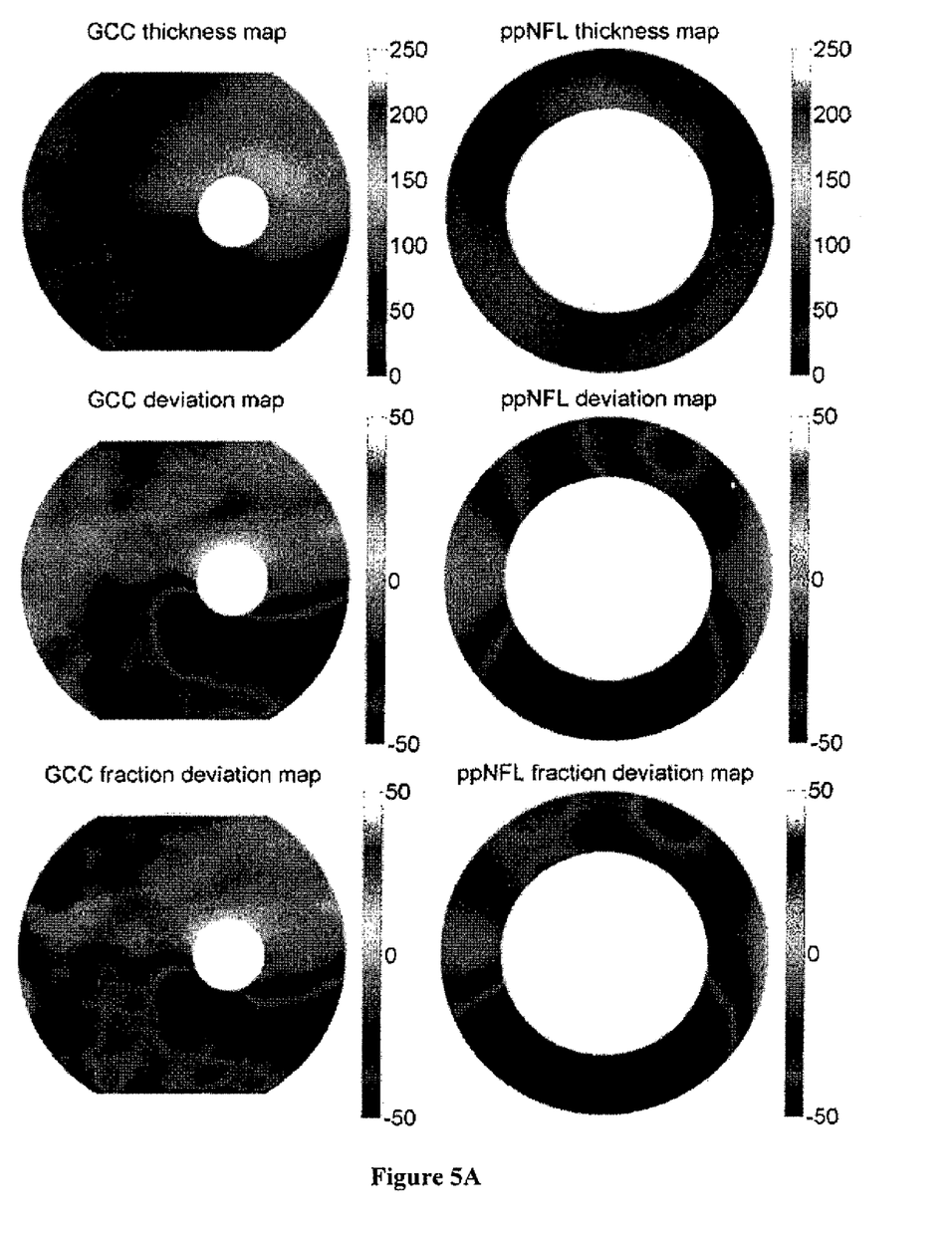
Figure 5B:
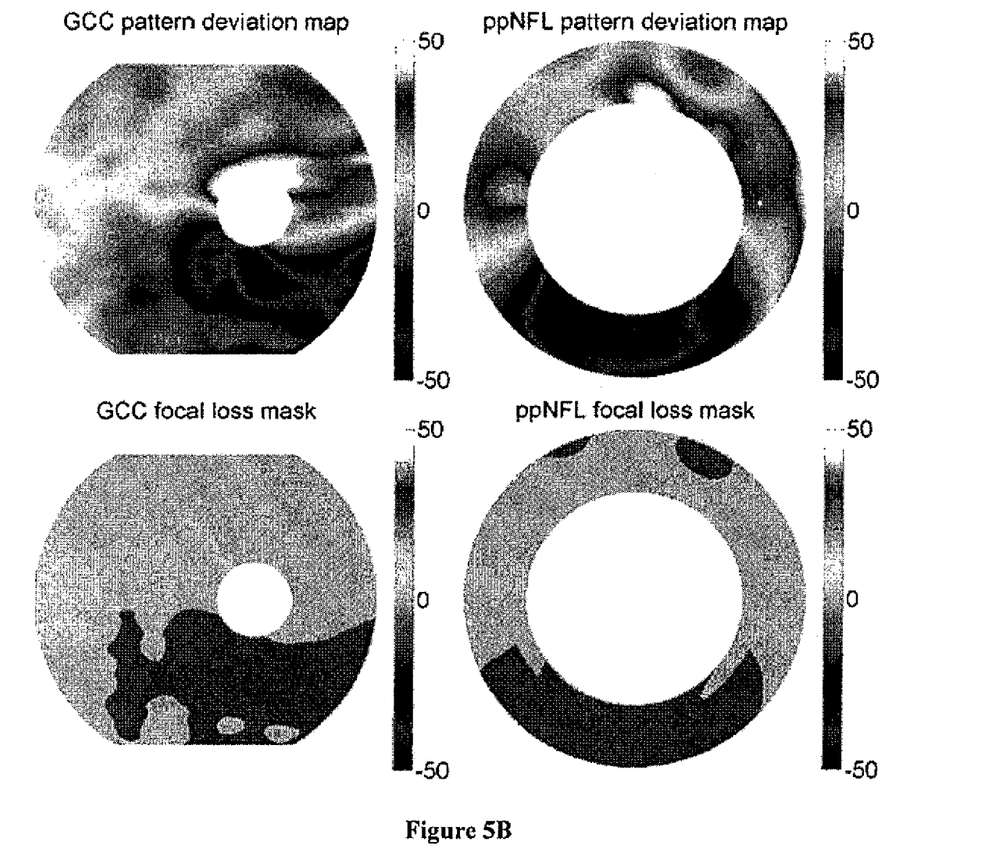

In one exemplary embodiment, maps of mGCC thickness loss—the deviation (D) map, the fractional deviation (FD) map and the pattern deviation (PD) map—were computed. First the mGCC maps of all normal eyes were averaged, point by point, to create a normal reference map. The D map is the thickness map under consideration minus the normal reference map. The FD map is the thickness map under consideration minus the normal reference map divided by the normal reference map. The pattern map is the mGCC thickness map normalized (divided) by its own overall average. The PD map is the pattern map under consideration minus the normal reference pattern. The FD map shows the percentage of mGCC loss. The PD map shows how the mGCC thickness pattern differs from normal. These deviation map calculation can be applied to other thickness map, such as NFL map or total retinal thickness map (FIG. 5A-B).

Three pattern-based diagnostic parameters were then computed from the two derivative maps. The FLV is the summation of FD in the region where there is significant focal loss. Significant focal loss mask is defined as FD more than 1.65 standard deviation (SD) below the normal average (below the fifth percentile of normal distribution) (FIG. 5). The GLV is the sum of FD in areas where FD is negative. The PCV is the root mean square of the PD map.

For ppNFL map, same method can be applied. However, FLV and GLV calculation on D map were preferred over fraction deviation map. Our experience showed that this provided higher diagnostic accuracy.

Glaucoma relatively spares the centrocecal area and has variable superior or inferior dominance (usually inferior). Pattern matching using cross-correlation is preferably used to distinguish between these types of glaucoma and normal. The analysis could be performed using D, FD or PD maps.

Figure 6:
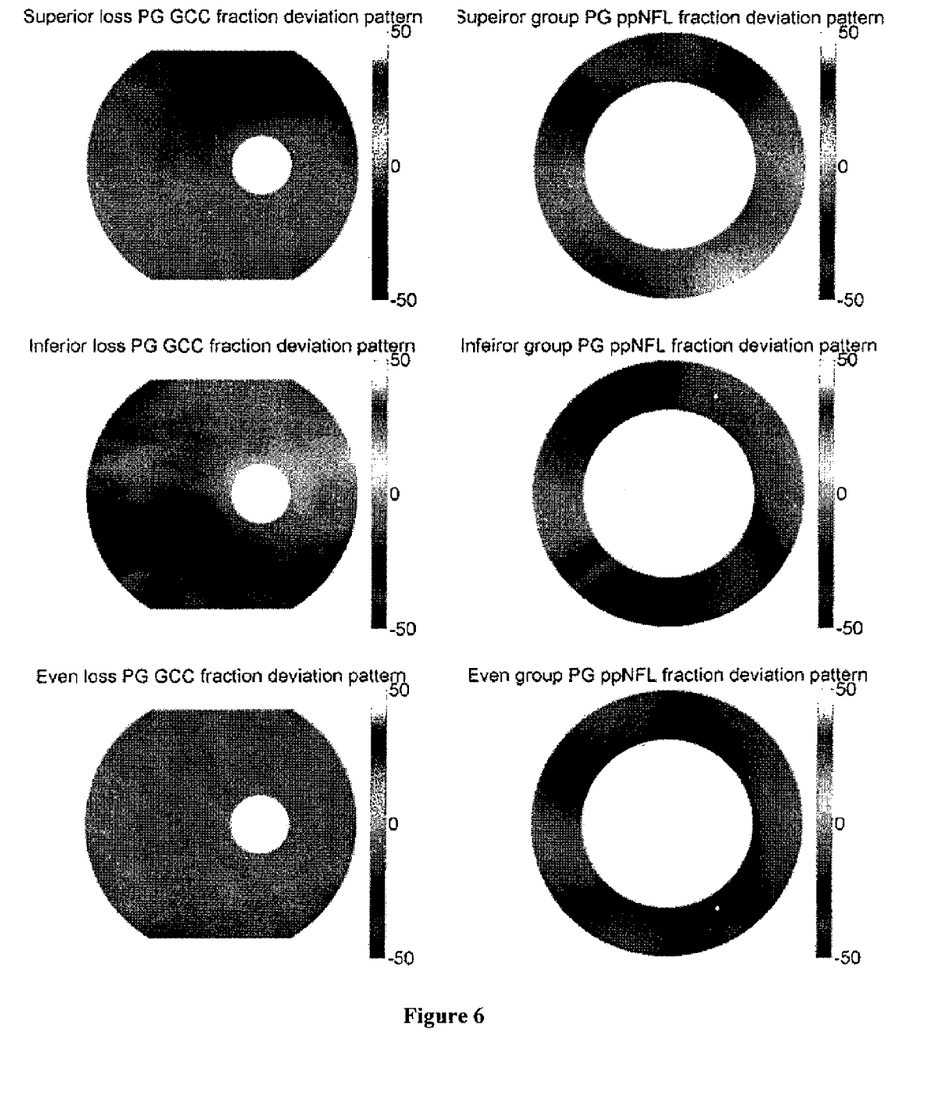
FIG. 6 shows exemplary characteristic maps of three types of glaucoma.

Preferably the PD map is used. The training dataset contain normal and glaucomatous eyes. The glaucomatous eyes are divided into the following 3 disease categories based on the pattern of loss of mGCC or ppNFL. This division could also be applied to ONH rim area or volume. The characteristic maps for each category of glaucoma is then compiled by averaging the maps of eyes within each category (FIG. 6).

As used herein, the terms Inferior glaucoma, Even glaucoma, and Superior glaucoma are defined as follows:

1. Inferior glaucoma (IG): average map of perimetric glaucoma eye with SID value>mean+1 SD of normal.
2. Even glaucoma (EG): average map of perimetric glaucoma eye with SID value within ±1 SD of normal.
3. Superior glaucoma (SG): average map of PG eye with SID value<mean−1 SD of normal.

The pattern cross-correlation (PCC) value is computed by cross-correlation of the map under testing with the characteristic maps of any type of glaucoma from one of the maps, such as fraction deviation map, pattern deviation map and deviation map. For example, FD-PCC can be defined as:

$$PCC = \int_A (FD \cdot CFD) / [(\int_A FD \cdot FD\, dxdy)^{1/2} (\int_A CFD \cdot CFD\, dxdy)^{1/2}]$$

where A is the area of the map, FD is the fraction deviation of the eye being tested, CFD is the characteristic pattern deviation of the disease under consideration, x is the horizontal dimension of the map, and y is the vertical dimension of the map.

Using PD and D map, similar parameter called PD-PCC and D-PCC may be created. For mGCC map, it is preferable to use FD map to calculate the PCC for glaucoma analysis. For ppNFL map, it is preferable to use D map to calculate the PCC for glaucoma analysis.

As there are three types of glaucoma, three PCC parameters are defined on mGCC map and other three PCC parameters are defined on ppNFL map. Accordingly, as used herein, the diagnostic parameters regarding PCC are denoted by GPCC for glaucoma analysis.

An Exemplary Combination of Parameters

A total of 21 parameters from the three maps were considered for combined parameters. They are FLV, GLV, PCV, overall average, inferior and superior thicknesses, inferior, superior and even GPCC diagnostic parameters from both mGCC and ppNFL maps, as well as cup/disc ratio, rim area and rim volume parameters from rim map.

It is important to know that a diagnostic power has no monotone trend with the number of predictors in a MLM. Thus, a subset of diagnostic parameters is searched to be the predictors used in MLM.

The inclusion or exclusion of a parameter is in general based on searching the best subset of parameters or forward-backward selection guided by optimizing the diagnostic power. The first method requires 2,097,151 ($2^{21}-1$) steps and the second method requires at least 21 steps for 21 diagnostic parameters. Both methods are computational expensive and might limit memory resources in computational software so that a computationally efficient approach is desirable. Also, neither method could guarantee that the remaining parameters are across three regions. For example, a previous eye study (9) had formulated a combined parameter from retinal nerve fiber layer (RNFL), ONH, and macular thickness scans based on time domain OCT. In this study, the selection for the best parameters to be combined was based on principle component analysis and followed by searching the best subset of parameters. The finalized combined parameters from the best subset were only across RNFL and ONH regions. Another eye study (8) had evaluated the best correlation between diagnostic parameters and visual field mean deviation (in general denoted by MD) to select 8 out of 38 parameters from the above three scans in time domain OCT. Once again, the selected 8 parameters were only across RNFL and ONH regions. None of the prior art methods were able to incorporate information from all three anatomic regions into their final diagnostic indicator. In contract, this invention provides an explicit 3-Step approach to combine parameters from the information across all three regions.

In one exemplary embodiment of this invention, the strategy as shown in FIG. 4 was used. The details and validation results are as follows:

Step 1: Combine Parameters Across mGCC, ppNFL and Rim Region

The parallel parameters were combined additively for FLV, GLV, PCV and three GPCC parameters (inferior, superior, and even) across regions.

Although in this embodiment, parameters from all three anatomic regions are used, in other embodiments, combinations that combine only mGCC and ppNFL parameters are also workable.

Step 2: Combine Inferior, Superior and Overall Information.

A global variable from the three combined GPCC parameters was defined to indicate the worst structural loss reflected by GPCC parameters (maximum among the three combined GPCC parameters). The diagnostic power was evaluated by the area under receiving operative characteristic curve (AROC). Table 1 summarizes the AROC values for each single and across regions parameters. The analysis was based on 50 normal and age-matched PG participants from AIGS study.

TABLE 1

Diagnostic Power Analysis for Single Fourier-Domain Optic Coherence Tomography Parameters.

| Analysis | Parameter | AROC | Standard Error |
|---|---|---|---|
| mGCC | mGCC FLV | 0.920 | 0.026 |
|  | mGCCGLV | 0.917 | 0.025 |
|  | mGCC superior GPCC | 0.864 | 0.032 |
|  | mGCC inferior GPCC | 0.881 | 0.029 |
|  | mGCC even GPCC | 0.880 | 0.030 |
|  | mGCCPCV | 0.894 | 0.027 |
|  | mGCC thickness AVG | 0.900 | 0.028 |
|  | mGCC thickness inferior | 0.874 | 0.031 |
|  | mGCC thickness superior | 0.884 | 0.029 |
| ppNFL | ppNFLFLV | 0.924 | 0.022 |
|  | ppNFL GLV | 0.908 | 0.027 |
|  | ppNFL even GPCC | 0.901 | 0.028 |
|  | ppNFL inferior GPCC | 0.891 | 0.029 |
|  | ppNFL superior GPCC | 0.888 | 0.031 |
|  | ppNFLPCV | 0.862 | 0.032 |
|  | ppNFLTAVG | 0.907 | 0.029 |
|  | ppNFLT inferior | 0.878 | 0.031 |
|  | ppNFLT superior | 0.885 | 0.032 |
| ONH | cup/disk area ratio | 0.862 | 0.037 |
|  | rim area | 0.875 | 0.034 |
|  | rim volume | 0.886 | 0.033 |
| Across Regions | FLV | 0.944 | 0.018 |
|  | GLV | 0.932 | 0.022 |
|  | PCV | 0.898 | 0.026 |
|  | GPCC | 0.918 | 0.024 |

It is clear from the table that the reduced set of global parameters (the Across Regions parameters) have higher diagnostic power than their component single-region parameters. For example, among the single-region parameters, the FLV parameters showed the highest AROC at around 0.92. After combination, the resulting combined FLV showed a 0.02 increased in AROC at about 0.94. Other parameters showed even greater improvement.

In effect, steps 1 and 2 of the method reduced an initial set of 21 trial parameters to 6 reduced global parameters which made efficient use of the information provided by the parameters of all three anatomic regions. Based on the results of Steps 1 and 2, four across-region parameters (FLV, GLV, PCV and GPCC), plus cup/disk area ratio and rim volume (higher AROC than rim area) were selected as the input for the MLM in Step 3.

Step 3: Machine Learning Method

Gaussian SVM and Gaussian RVM were used in this invention, where the Gaussian kernels allowed for non linear relationship between N and PG groups. The Gaussian kernel was also used in other studies to discriminate N from glaucomatous eyes (6, 12, 13).

Cross Validation and AROC Optimization

Cross validation and grid search may be used to search the unknown parameters that underline the MLM models. In the Gaussian kernel function, the unknown parameter is the scale parameter ($\sigma^2$); in SVM, it is the penalty parameter for misclassification (C), and only $\sigma^2$ in RVM. In exemplary embodiments of this invention, those unknown parameters were estimated in optimization during the training process guided by AROC.

The process of MLM requires independent samples for training and testing datasets. To efficiently use a dataset, cross validation was used to create training and testing dataset crossly. All participants were randomly divided into k sets. Each of k sets was tested while the other k−1 sets were used as a training dataset to create supporting vectors for SVM and relevance vectors for RVM. Hence, the test and training dataset were independent samples and the training dataset remained a big portion (k−1)/k of a whole sample used in optimization to discriminate N from PG eyes. The grid search was used to search the parameters ($\sigma^2$, C, k) optimizing the AROC generated by SVM scores and RVM scores respectively.

Figure 7:
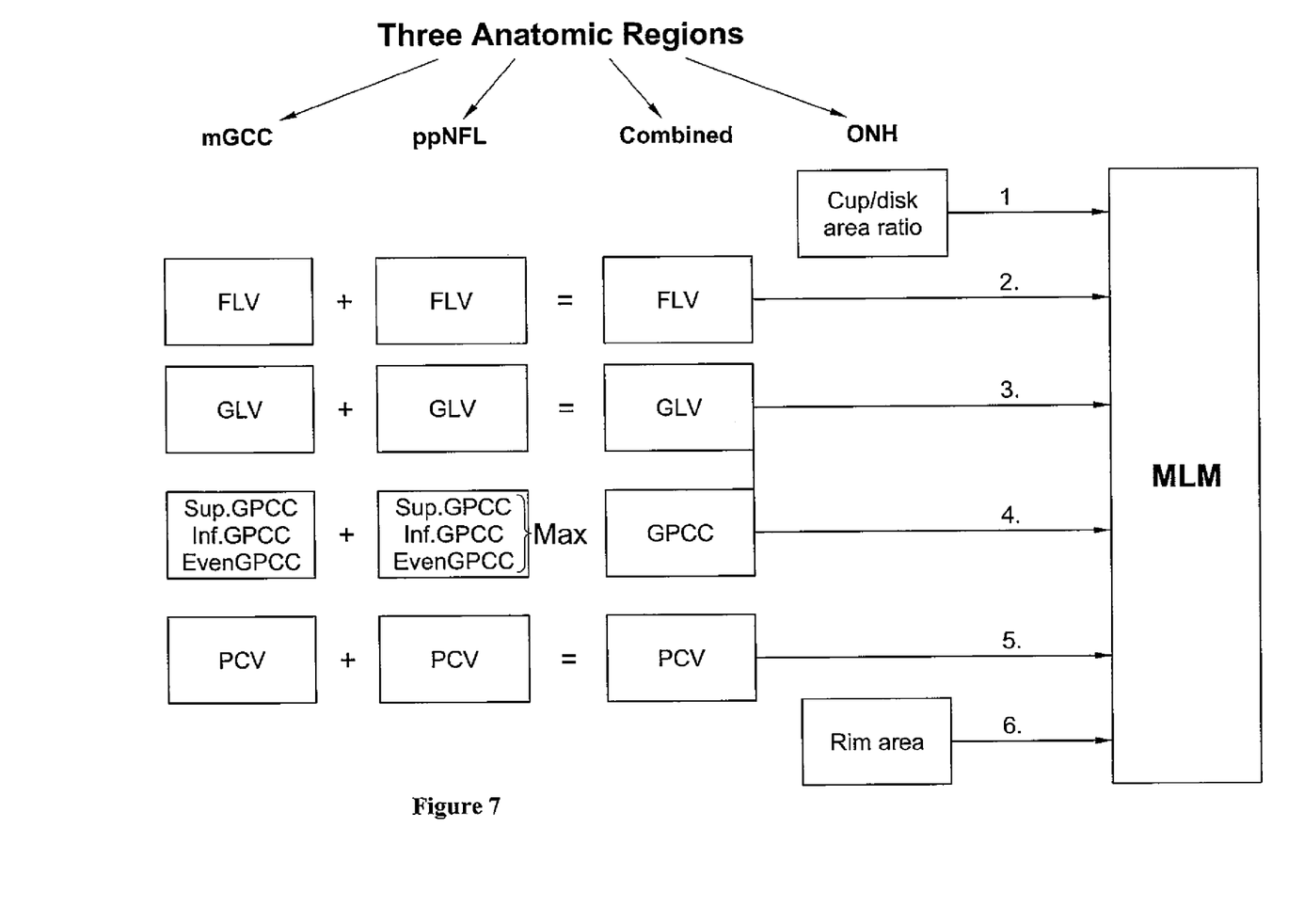
FIG. 7 shows flow chart outlining the procedures for combining diagnostic parameters. The abbreviations Sup. and Inf. denote superior and inferior while Max denotes maximum among three combined GPCC parameters. The other abbreviations are summarized in Table 1.

FIG. 7 is a flow chart illustrating in detail the three-steps process of combining parameters. The first four columns illustrate combining parameters based on Steps 1 and 2 as described above. The last column illustrates feeding the best subset of parameters to MLM to arrive at a single diagnostic indicator as described in Step 3 above.

Evaluation of Diagnostic Power

Sensitivity and specificity at 1% threshold, in addition to AROC, were used as benchmarks to further evaluate the diagnostic power of the SVM- and RVM-generated final composite scores along with the best single diagnostic parameters from each anatomic region. The best single parameters are mGCC FLV, ppNFL FLV, rim volume and cup/disk area ratio.

The mGCC and ppNFL overall average thickness were also evaluated since the average thickness parameter is in common used for glaucoma diagnosis in clinics. Table 2 summarizes the results of the diagnostic power evaluation. With the 3-Steps approach of this invention, both SVM- and RVM-generated parameters have the best power to discriminate N from PG eyes. For example, compare to the single-region parameter with the best AROC value, the method of this invention improved the AROC value from 0.92 to about 0.96 and enhanced the sensitivity from 0.57 to about 0.78.

Possibly because of the small study sample, the improvement of AROC was marginally significant ($p \leq 0.10$) compared to mGCC FLV. However, the improvement over the other parameters were (highly) statistically significant. In clinical settings, the threshold of sensitivity at 1% threshold would be more practical than the AROC values. The improvement in sensitivity is dramatic ($p < 0.005$) and the increment is more than 35%.

These results demonstrate that methods of this invention, which is based on the concept of combining diagnostic parameters from three anatomic regions, is able to significantly increase the diagnostic power in discriminating N from PG eyes.

TABLE 2

Diagnostic Power Analyses for Best Fourier-Domain Fourier-Domain Optic Coherence Tomography Parameters

| OCT parameters | AROC (SE) | P1 | P2 | Sensitivity (SE) | P1 | P2 | Specificity (SE) | Threshold |
|---|---|---|---|---|---|---|---|---|
| SVM on[a] | 0.963 (0.014) | — | 0.40 | 0.79 (0.05) | — | 0.32 | 1.00 (0.00) | 0.20 |

TABLE 2-continued

Diagnostic Power Analyses for Best Fourier-Domain Fourier-Domain Optic Coherence Tomography Parameters

| OCT parameters | AROC (SE) | P1 | P2 | Sensitivity (SE) | P1 | P2 | Specificity (SE) | Threshold |
|---|---|---|---|---|---|---|---|---|
| RVM on [a] | 0.960 (0.014) | 0.40 | — | 0.78 (0.05) | 0.32 | — | 1.00 (0.00) | 0.83 |
| ppNFL FLV (%) | 0.924 (0.022) | 0.02 | 0.03 | 0.46 (0.07) | <0.0001 | 0.0001 | 1.00 (0.00) | 15.58 |
| mGCC FLV (%) | 0.920 (0.026) | 0.09 | 0.10 | 0.57 (0.07) | 0.0019 | 0.003 | 0.99 (0.01) | 5.39 |
| ppNFLT AVG (μm) | 0.907 (0.029) | 0.01 | 0.02 | 0.57 (0.07) | 0.0012 | 0.002 | 1.00 (0.00) | 75.22 |
| mGCCT AVG (μm) | 0.900 (0.028) | 0.001 | 0.01 | 0.46 (0.07) | <0.0001 | 0.0001 | 0.99 (0.01) | 81.10 |
| Rim volume (mm$^3$) | 0.886 (0.033) | 0.002 | 0.003 | 0.40 (0.07) | <0.0001 | <0.0001 | 0.96 (0.03) | 0.081 |
| Cup/disk area ratio | 0.862 (0.037) | 0.001 | 0.002 | 0.29 (0.07) | <0.0001 | <0.0001 | 0.96 (0.03) | 0.74 |

Abbreviations: SVM = supporting vector machine; RVM = relevance vector machine; P1 = p-value compared to SVM; P2 = p-value compared to RVM. The other abbreviations are same as in Table 1.
[a] The parameters are based on combined parameters: FLV, GLV, PCV, and GPCC, and single parameters: cup to disk ratio and rim volume.
The differences among specificities are not statistically significant.

Alternative Embodiments

In one alternative embodiment, the superior/inferior/even GPCC for the rim may be calculated in the same way as demonstrated above for mGCC and ppNFL. This will allow the rim parameters to be combined with other parameters in Step 1.

In another alternative embodiment, a maximum GPCC from the three patterns for each region may be calculated first. Then the GPCC for the three regions may be combined by addition. For other parameters, as they only provide the overall value, the flowchart does not need to be changed.

In another alternative embodiment, the superior/inferior/even combination may also be advantageously applied to other parameters. For example, the superior quadrant/inferior quadrant/overall average values can be computed first for ppNFL thickness. The resulting values can then be normalized according to a normal reference. Similarly, normalized superior hemisphere/inferior hemisphere/overall average of mGCC thickness and normalized superior quadrant/inferior quadrant/overall average of disk rim can also be calculated. Then, the normalized superior parameters can be combined in Step 1 by addition. This combination will result in a reduced GPCC for the superior pattern. In the same way, the reduced GPCC for inferior and overall pattern can also be computed. Finally, the reduced GPCC from the three regions may be combined in Step 2 by finding their minimum. For FLV and GLV, superior/inferior/even parameter may be obtained by limiting the integration area to superior/inferior/overall region. Parallel parameters from each of the three regions can be combined in Step 1 by addition. Then the superior/inferior/even GPCC may be combined by finding their minimum. For PCV, parallel parameters from three regions may be combined in Step 1 by addition. Then, the reduced PCV parameters may be combined in Step 2 by finding their maximum. After all the initial parameters are properly reduced to a set of reduced global parameters in Step 2, they can be fed to an MLM in Step 3. Here, the machine classifier is not particularly limited. Exemplary machine classifiers may include LDF, logistic regression model, SVM and RVM, but are not limited thereto. Preferably, Gaussian SVM and Gaussian RVM are used because Gaussian kernels allowed for non-linear relationship between N and PG groups.

In another alternative embodiment, combination of superior/inferior/even parameters can be applied first before combination of the 3 regions. For ppNFL thickness, the superior quadrant/inferior quadrant/overall average can be computed and then normalized according to a normal reference. In the same way, normalized superior hemisphere/inferior hemisphere/overall average of mGCC thickness, normalized superior quadrant/inferior quadrant/overall average of disk rim can also be computed first. Then, the normalized ppNFL parameters can be combined by finding their minimum in Step 1. This combination yields a reduced GPCC parameter for ppNFL. In the same way, reduced GPCC parameters for mGCC and rim may also be obtained. Finally, the three reduced GPCC parameters may be combined by addition in Step 2 to yield a reduced global GPCC parameter. For FLV and GLV, superior/inferior/overall parameter may be computed by limiting the integration area to superior/inferior/overall region. The pattern parameters for each region may be combined in Step 1 by finding their minimum. Then, the reduced ppNFL/mGCC/rim parameters may be combined by addition. For PCV, the three pattern parameters for the same region may be combined in Step 1 by finding their maximum. Then, they may be combine across the region in Step 2 by addition. After the initial set of parameters were reduced to a reduced set of global parameters incorporating information from all three anatomic regions, they can be provided as inputs to MLM in Step 3 to arrive at a single diagnostic indicator. As in above, the MLM can be any suitable machine classifier known in the art, including LDF, logistic regression model, SVM and RVM, but are not limited thereto. Preferably, Gaussian SVM and Gaussian RVM are used because Gaussian kernels allowed for non linear relationship between N and PG groups.

Example

Three Steps to Combine FD-OCT Parameters from Three Anatomic Regions

Step 1: Combine Parallel Parameters Across mGCC, ppNFL and Rim Regions

To generate "across region" parameters, a simple method that combines parallel parameters for FLV, GLV, GPCC and PCV across mGCC and ppNFL regions by a weighted sum was considered. This method was computationally inexpensive. The weight was one for each region. It was evaluated by AROC analysis such that the "across region" parameters were combined additively with weight one if no statistical difference between the AROC values of parallel parameters. The weights were proportional to the AROC's and were summed up to two as the statistically difference of AROC values was observed.

Step 2: Combine Inferior, Superior and Overall Region Information

A global variable from the three across-region GPCC parameters was defined to indicate the worst structural loss reflected by GPCC parameters (maximum among the three GPCC parameters) and denoted by global GPCC. The final set of input parameters used in MLM would be 4 across-region parameters (FLV, GLV, global GPCC and PCV) and two parameters from the rim region; cup/disk area ratio and a rim parameter.

It is important to know that the selection of input parameters would influence the performance of MLM in classification analysis. Rather than using a computationally intense process to select the input parameters, this invention uses the first two steps to combine the initial parameters across anatomic regions and reduce the parameters from 15 initial parameters to 6 reduced global parameters to be used as input in MLM.

Moreover, the pattern concordance analysis between mGCC and ppNFL analysis for GPCC parameter was conducted to validate the hypothesis that all three anatomic regions would show analogous patterns of structural damages. The dominant area with the worst structural loss reflected by GPCC parameters was indicated by the GPCC parameter with the maximum value and the distribution of the worst dominant area was described for each group in each region. Thus, the glaucomatous damage can be categorized into three sets for inferior-dominant, superior-dominant, and even-dominant damage. The Kappa estimates were calculated to quantify the agreement between mGCC and ppNFL pattern. The comparisons between Kappa estimates were based on a two-tailed Z test.

Step 3: Use MLM to Generate a Single Indicator of Glaucoma Status

To classify the reduced diagnostic parameters into a single diagnostic indicator, two types of MLM—SVM and RVM— were carried out. The SVM approach searches a hyperplane that optimizes the margin between classes (N and PG in this study) in classification analysis. The relationship between classes can be linear, or nonlinear through a kernel function (Gaussian, polynomial, wavelet, and so on). In brief, a training process is followed by a testing process in SVM. In the training process, SVM uses the training dataset to find supporting vectors that optimize the separation between N and PG groups. Once the SVM is trained, those supporting vectors are applied to the test dataset and generate predictive scores for each observation in the test dataset.

The RVM approach is basically an extension of SVM. It generalizes the methodology with a Bayesian approach adopted during optimizing the margin between classes and searches relevance vectors in the training process. The RVM-generated composite scores can be further transformed into a zero-to-one probability score, that is, the probability for glaucoma in a test subject. The scores could provide ophthalmologists a more intuitive interpretation for glaucoma diagnosis. Especially, the Bayesian machine learning classifier was also used in the HRT3 scanning laser tomography (SLT) machine to generate the glaucoma probability score (GPS), thus, the concept of RVM-generated probability score is already familiar and accepted by clinicians.

Gaussian SVM and RVM were used in this study.

Sensitivity and Specificity Analyses

Sensitivity and specificity at 5% and 1% thresholds were used to further evaluate the diagnostic power of the final generated SVM and RVM predicted scores beyond the AROC analysis. The parametric distribution of a diagnostic parameter was verified by visualizing a histogram as well as Kolmogorov-Smirnov test. Nonparametric distribution was used if none of parametric distributions could be fitted. The thresholds of a Gaussian distributed parameter can be formulated as $mean_N + Z_o SD_N$, where $mean_N$ and $SD_N$ were the mean and standard deviation of the normal group, $Z_o = -1.65$ for the 5% cutoff, and $Z_o = -2.33$ for the 1% cutoff. The parametric distribution of a non-Gaussian parameter or non parametric distribution were estimated based on 10,000 replicates, in which one eye was randomly selected from each participant. Both eyes of each participant were analyzed. To handle the inter-eye correlation, a generalized estimating equation (GEE) approach was incorporate in the t-tests to compare clinical information mean difference between groups while the Bootstrap p values were used in the Kappa analysis. The inter-eye correlation was also appropriated handled in AROC, sensitivity and specificity analyses with formula derived for clustered samples. The formula have been widely used in previous AIGS studies. For carrying out MLM, one eye from each participants was randomly selected to build up the learning models in the training process since the models for MLM do not handle the inter-eye correlation while both eyes were used in the testing process to evaluate the prediction power based on AROC analysis with the inter-eye correlation appropriately handled.

The level of significance was set at $P<0.05$. The analyses were done in SAS 9.1 and in MATLAB 7.0. Exemplary MATLAB codes were freely available from Prof Alain Rakotomamonjy at the University of Rouen for SVM, and from Mike Tipping's personal web-site for RVM.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

What is claimed is:

1. A machine classifier based method of diagnosing glaucoma in a subject, comprising:
    obtaining OCT images from three anatomic regions of the subject's eye, wherein said three anatomic regions consists of the mGCC, the ppNFL, and the ONH;
    processing the images to obtain a predetermined collection of diagnostic parameters, wherein said collection of diagnostic parameters comprises the following characteristics:
        a. each parameter is classified as belonging to one of the three anatomic regions,
        b. in cases where the parameter is a pattern cross-correlation parameter, it is further classified as one of a GPCC type selected from superior, inferior, and even, and
        c. at least the mGCC and the ppNFL regions are represented in the collection of diagnostic parameters; and
    transforming the collection of diagnostic parameters by combining them across anatomic regions and GPCC types according to a predetermined combination formula to arrive at a set of reduced global parameters; and applying a pre-trained machine classifier to the reduced global parameters to arrive at a single indicator for the subject's glaucoma status.

2. The method of claim 1, wherein said predetermined collection of diagnostic parameters include parameters of all three types of GPCC for each anatomic region.

3. The method of claim 1, wherein said predetermined collection of diagnostic parameters further include parameters for the ONH region.

4. The method of claim 1, wherein said predetermined combination formula comprises transforming the diagnostic parameters into six reduced global parameters consisting of a global GPCC, a combined-region FLV, a combined-region GLV, a combined-region PCV, a cup/disk, and a rim parameter.

5. The method of claim 1, wherein said machine classifier is one selected from the group consisting of LDF, logistic regression, SVM, and RVM.

6. The method of claim 1, wherein said combination formula comprises the steps of:
combining diagnostic parameters of different anatomic regions; followed by
combining diagnostic parameters of different GPCC types.

7. The method of claim 1, wherein said combination formula comprises the steps of:
combining diagnostic parameters of different GPCC types within each anatomic region; followed by
combining diagnostic parameters of different anatomic regions.

8. The method of claim 1 further comprising a step of adjusting the indicator to account for the patient's age.

9. The method of claim 1, wherein said OCT images are obtained by an FD-OCT device.

10. A method of training a machine classifier for glaucoma diagnosis, comprising:
providing a training dataset consisting of an initial set of diagnostic parameters obtained from a sample population of subjects, wherein said subjects consists of a first population of healthy patient and a second population of patients suffering from perimetric glaucoma, and said initial set of diagnostic parameters has the following characteristics:
a. each diagnostic parameter is derived from OCT images of an anatomic region of a subject's eye selected from the group consisting of mGCC, ppNFL, and ONH, and
b. in cases where the diagnostic parameter is a pattern cross-correlation parameter, it is further classified as being one of three GPCC types selected from superior, inferior, and even;
selecting a trial set of diagnostic parameters such that at least the mGCC and the ppNFL regions are represented;
transforming the trial set of diagnostic parameters by combining them across regions and GPCC types to arrive at a set of reduced global parameters;
training the machine classifier to distinguish between healthy and glaucomatous using the reduced global parameters as inputs; and
optimizing the machine classifier using AROC as a guide.

11. The method of claim 10, wherein said trail set of diagnostic parameters include parameters of all three GPCC types for each anatomic region.

12. The method of claim 10, wherein said trial set of diagnostic parameters further include parameters for the ONH region.

13. The method of claim 10, wherein said transforming step comprises the steps of:
combining the diagnostic parameters of different anatomic regions; followed by
combining diagnostic parameters of different GPCC types.

14. The method of claim 10, wherein said transforming step comprises the steps of:
combining diagnostic parameters of different GPCC types within each anatomic region; followed by
combining diagnostic parameters of different anatomic regions.

15. The method of claim 10, wherein said machine classifier is one selected from the group consisting of LDF, logistic regression, SVM, and RVM.

16. The method of claim 10, wherein said OCT images are obtained by a FD-OCT device.

17. A system for diagnosing glaucoma in a patient, comprising:
a computing unit configured for receiving a predetermined collection of diagnostic parameters, transforming the collection of diagnostic parameters according to a predetermined formula to arrive at a reduced set of global parameters, and applying a pre-trained machine classifier to the reduced global parameters to arrive at a single indicator; and
an input/output unit operatively connected to the computing unit for receiving input from an end user and outputting the indicator to the end user,
wherein said collection of diagnostic parameters has the following characteristics:
a. each diagnostic parameter is derived from OCT images of an anatomic region of the patient's eye selected from the group consisting of the mGCC, the ppNFL, and the ONH,
b. in cases where the parameter is a pattern cross-correlation parameter, it is further classified as one of three GPCC types consisting of superior, inferior, and even; and
c. at least the mGCC and the ppNFL regions are represented in the collection of diagnostic parameters.

18. The system of claim 17, wherein said collection of diagnostic parameters include all three types of GPCC for each anatomic region.

19. The system of claim 17, wherein said collection of diagnostic parameters further include parameters for the ONH region.

20. The system of claim 17, further comprising a OCT device for obtaining tomographic images of the patient's eye.

21. The system of claim 20, wherein said OCT device is a FD-OCT.

* * * * *